United States Patent
Kato et al.

(10) Patent No.: US 9,222,425 B2
(45) Date of Patent: Dec. 29, 2015

(54) AIR-FUEL RATIO IMBALANCE DETECTING DEVICE AND AIR-FUEL RATIO IMBALANCE DETECTING METHOD FOR INTERNAL COMBUSTION ENGINE OF VEHICLE

(71) Applicants: Toshikazu Kato, Toyota (JP); Yusuke Fujitsu, Anjo (JP)

(72) Inventors: Toshikazu Kato, Toyota (JP); Yusuke Fujitsu, Anjo (JP)

(73) Assignees: TOYOTA JIDOSHA KABUSHIKI KAISHA, Toyota-shi (JP); DENSO CORPORATION, Kariya-shi (JP)

( * ) Notice: Subject to any disclaimer, the term of this patent is extended or adjusted under 35 U.S.C. 154(b) by 154 days.

(21) Appl. No.: 13/755,615

(22) Filed: Jan. 31, 2013

(65) Prior Publication Data
US 2013/0204511 A1 Aug. 8, 2013

(30) Foreign Application Priority Data

Feb. 3, 2012 (JP) ................................. 2012-021726

(51) Int. Cl.
| F02D 41/00 | (2006.01) |
| F02D 41/14 | (2006.01) |
| B60W 20/00 | (2006.01) |
| B60W 10/06 | (2006.01) |
| B60W 10/08 | (2006.01) |

(52) U.S. Cl.
CPC ............... F02D 41/00 (2013.01); B60W 10/06 (2013.01); B60W 10/08 (2013.01); B60W 20/108 (2013.01); F02D 41/0002 (2013.01); F02D 41/1456 (2013.01); B60Y 2300/431 (2013.01); F02D 41/008 (2013.01); F02D 2250/24 (2013.01); Y02T 10/42 (2013.01); Y02T 10/6286 (2013.01)

(58) Field of Classification Search
CPC .............. F02D 41/00; F02D 2041/001; F02D 2200/0406; F02D 2200/0402; F02D 41/18
USPC ......................................................... 701/103
See application file for complete search history.

(56) References Cited

U.S. PATENT DOCUMENTS

| 2008/0275623 A1* | 11/2008 | Osumi et al. .................. 701/103 |
| 2011/0174282 A1* | 7/2011 | Maruyama et al. ........... 123/703 |
| 2011/0192146 A1* | 8/2011 | Sugimoto et al. ............... 60/276 |

(Continued)

FOREIGN PATENT DOCUMENTS

| JP | 2008-14178 A | 1/2008 |
| JP | 2009-270543 A | 11/2009 |
| JP | 2010-137723 A | 6/2010 |

(Continued)

*Primary Examiner* — Stephen K Cronin
*Assistant Examiner* — Joshua A Campbell
(74) *Attorney, Agent, or Firm* — Oblon, McClelland, Maier & Neustadt, L.L.P.

(57) ABSTRACT

When a detected value for detecting a rich imbalance in air-fuel ratio among cylinders, in a state where an intake air amount of an engine falls within a low amount region, is lower than a first threshold corresponding to the intake air amount and is higher than or equal to a second threshold corresponding to the intake air amount, a hybrid electronic control unit controls the engine such that the intake air amount falls within a high amount region, and controls a motor generator such that electric power corresponding to a power increase amount is consumed. When the intake air amount falls within the high amount region, the hybrid electronic control unit detects a rich imbalance in air-fuel ratio among the cylinders by comparing the detected value with a third threshold corresponding to the intake air amount.

5 Claims, 4 Drawing Sheets

(56) References Cited

U.S. PATENT DOCUMENTS

2012/0136552 A1\* 5/2012 Kato et al. .................... 701/102
2012/0173115 A1 7/2012 Sawada et al.

FOREIGN PATENT DOCUMENTS

JP 2011-144785 7/2011
WO WO 2011/001539 A1 1/2011

\* cited by examiner

AIR-FUEL RATIO IMBALANCE DETECTING DEVICE AND AIR-FUEL RATIO IMBALANCE DETECTING METHOD FOR INTERNAL COMBUSTION ENGINE OF VEHICLE

INCORPORATION BY REFERENCE

The disclosure of Japanese Patent Application No. 2012-021726 filed on Feb. 3, 2012 including the specification, drawings and abstract is incorporated herein by reference in its entirety.

BACKGROUND OF THE INVENTION

1. Field of the Invention

The invention relates to an air-fuel ratio imbalance detecting device and air-fuel ratio imbalance detecting method for an internal combustion engine of a vehicle.

2. Description of Related Art

In an existing art, there is known a device in which, in a state where an operating state of an internal combustion engine is a predetermined steady operation state, when a variation per unit time in air-fuel ratio detected by an air-fuel ratio sensor provided in an exhaust pipe falls outside a predetermined range, it is determined that there is an imbalance in air-fuel ratio among cylinders of the internal combustion engine (for example, see Japanese Patent Application Publication No. 2011-144785 (JP 2011-144785 A)). In this way, the device described in JP 2011-144785 A simply determines whether there is an imbalance in air-fuel ratio among the cylinders of the internal combustion engine.

In the above-described existing air-fuel ratio imbalance detecting device for an internal combustion engine, when an intake air amount of the internal combustion engine is small, an output value of the air-fuel ratio sensor becomes small. This reduces a difference between the output value when there is an imbalance in air-fuel ratio among the cylinders of the internal combustion engine and the output value when there is no imbalance.

Therefore, the existing air-fuel ratio imbalance detecting device for an internal combustion engine may not be able to detect an imbalance in air-fuel ratio among the cylinders of the internal combustion engine or may erroneously detect an imbalance.

SUMMARY OF THE INVENTION

The invention provides an air-fuel ratio imbalance detecting device and air-fuel ratio imbalance detecting method for an internal combustion engine of a vehicle, which accurately detect an imbalance in air-fuel ratio among cylinders of the internal combustion engine.

A first aspect of the invention provides an air-fuel ratio imbalance detecting device for an internal combustion engine of a vehicle that includes: the internal combustion engine; a rotating electrical machine; a drive wheel; and a power split mechanism that splits power generated by the internal combustion engine into power that drives the rotating electrical machine and power that drives the drive wheel. The air-fuel ratio imbalance detecting device includes: a rich imbalance detecting unit that, when an intake air amount of the internal combustion engine falls within a predetermined first detection region and falls within a predetermined second detection region that is higher than the first detection region, detects a rich imbalance in air-fuel ratio among a plurality of cylinders formed in the internal combustion engine on the basis of a variation per unit time in air-fuel ratio that is detected by an air-fuel ratio sensor provided in an exhaust passage of the internal combustion engine; an internal combustion engine control unit that, when the variation that is detected by the rich imbalance detecting unit in the first detection region falls within a predetermined range, controls the internal combustion engine so as to operate at the intake air amount that falls within the second detection region; and a rotating electrical machine control unit that controls the rotating electrical machine such that the rotating electrical machine consumes a power corresponding to a power increase amount of the internal combustion engine through operation of the internal combustion engine at the intake air amount that falls within the second detection region.

With this configuration, the air-fuel ratio imbalance detecting device according to the first aspect of the invention increases the intake air amount of the internal combustion engine while adjusting the power that is consumed by the rotating electrical machine to thereby increase the amount of exhaust gas that is emitted from the internal combustion engine on the condition that the detected value (variation per unit time in air-fuel ratio) for detecting a rich imbalance in air-fuel ratio among the cylinders falls within the predetermined range. By so doing, it is possible to improve the detection accuracy of the air-fuel ratio sensor, and it is possible to accurately detect an imbalance in air-fuel ratio among the cylinders of the internal combustion engine.

In the above configuration, the rich imbalance detecting unit may detect a rich imbalance in air-fuel ratio among the cylinders on the basis of a minimum value of the variation per unit time in air-fuel ratio while the internal combustion engine operates one cycle.

With this configuration, the air-fuel ratio imbalance detecting device according to the first aspect of the invention is able to reduce the detected value when there occurs an imbalance in air-fuel ratio among the cylinders of the internal combustion engine. By so doing, it is possible to increase a difference between the detected value when there is an imbalance in air-fuel ratio among the cylinders of the internal combustion engine and the detected value when there is no imbalance.

In the above configuration, the rich imbalance detecting unit may detect a rich imbalance in air-fuel ratio among the cylinders on the basis of an average of a predetermined number of the minimum values.

With this configuration, the air-fuel ratio imbalance detecting device according to the first aspect of the invention is able to suppress detection of an imbalance in air-fuel ratio among the cylinders due to another factor, such as a disturbance, other than an abnormality of operation of the internal combustion engine.

In the above configuration, the rotating electrical machine control unit may control the rotating electrical machine such that the rotating electrical machine consumes the power corresponding to the power increase amount of the internal combustion engine in order for the power that drives the drive wheel not to change through control of the internal combustion engine control unit for operating the internal combustion engine at the intake air amount that falls within the second detection region.

With this configuration, the air-fuel ratio imbalance detecting device according to the first aspect of the invention is able to suppress influence on drivability when the internal combustion engine control unit controls the internal combustion engine so as to operate at the intake air amount that falls within the second detection region.

A second aspect of the invention provides an air-fuel ratio imbalance detecting method for an internal combustion engine of a vehicle that includes: the internal combustion engine; a rotating electrical machine; a drive wheel; and a power split mechanism that splits power generated by the internal combustion engine into power that drives the rotating electrical machine and power that drives the drive wheel. The air-fuel ratio imbalance detecting method includes: when an intake air amount of the internal combustion engine falls within a predetermined first detection region and falls within a predetermined second detection region that is higher than the first detection region, detecting a rich imbalance in air-fuel ratio among a plurality of cylinders formed in the internal combustion engine on the basis of a variation per unit time in air-fuel ratio that is detected by an air-fuel ratio sensor provided in an exhaust passage of the internal combustion engine; when the variation that is detected in the first detection region falls within a predetermined range, controlling the internal combustion engine so as to operate at the intake air amount that falls within the second detection region; and controlling the rotating electrical machine such that the rotating electrical machine consumes a power corresponding to a power increase amount of the internal combustion engine through operation of the internal combustion engine at the intake air amount that falls within the second detection region.

According to the aspects of the invention, it is possible to accurately detect an imbalance in air-fuel ratio among the cylinders of the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. The following description will be made on an example in which an air-fuel ratio imbalance detecting device for an internal combustion engine according to the invention is applied to a power split-type hybrid vehicle.

Figure 1:
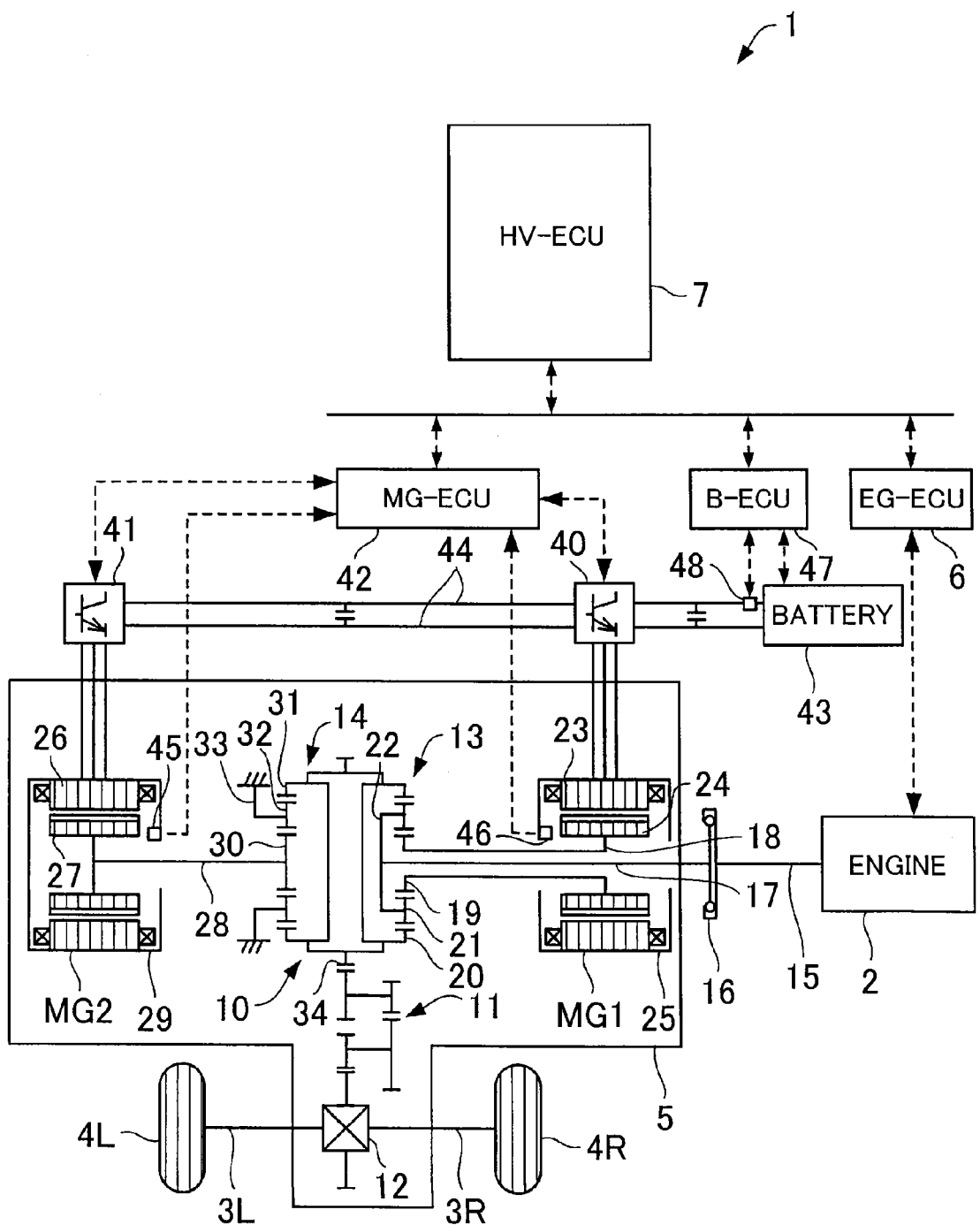
FIG. 1 is a functional block diagram that shows the configuration of a vehicle to which an air-fuel ratio imbalance detecting device for an internal combustion engine according to an embodiment of the invention is applied.

As shown in FIG. 1, the hybrid vehicle 1 according to the embodiment includes an engine 2, a transaxle 5, an engine electronic control unit (hereinafter, referred to as "EG-ECU") 6 and a hybrid electronic control unit (hereinafter, referred to as "HV-ECU") 7. The engine 2 constitutes an internal combustion engine. The transaxle 5 transmits power, generated by the engine 2, to drive wheels 4R and 4L via drive shafts 3R and 3L. The EG-ECU 6 controls the engine 2. The HV-ECU 7 controls various portions of the hybrid vehicle 1.

In the present embodiment, the engine 2 is formed of an in-line four-cylinder engine that uses gasoline as fuel. According to the invention, the engine 2 may be formed of various types of engine, such as an in-line six-cylinder engine, a V-six engine, a V-twelve engine and a horizontally opposed six-cylinder engine.

Fuel that is used in the engine 2 may be a hydrocarbon-based fuel, such as light oil, instead of gasoline or may be alcohol fuel that mixedly contains alcohol, such as ethanol, and gasoline.

Figure 2:
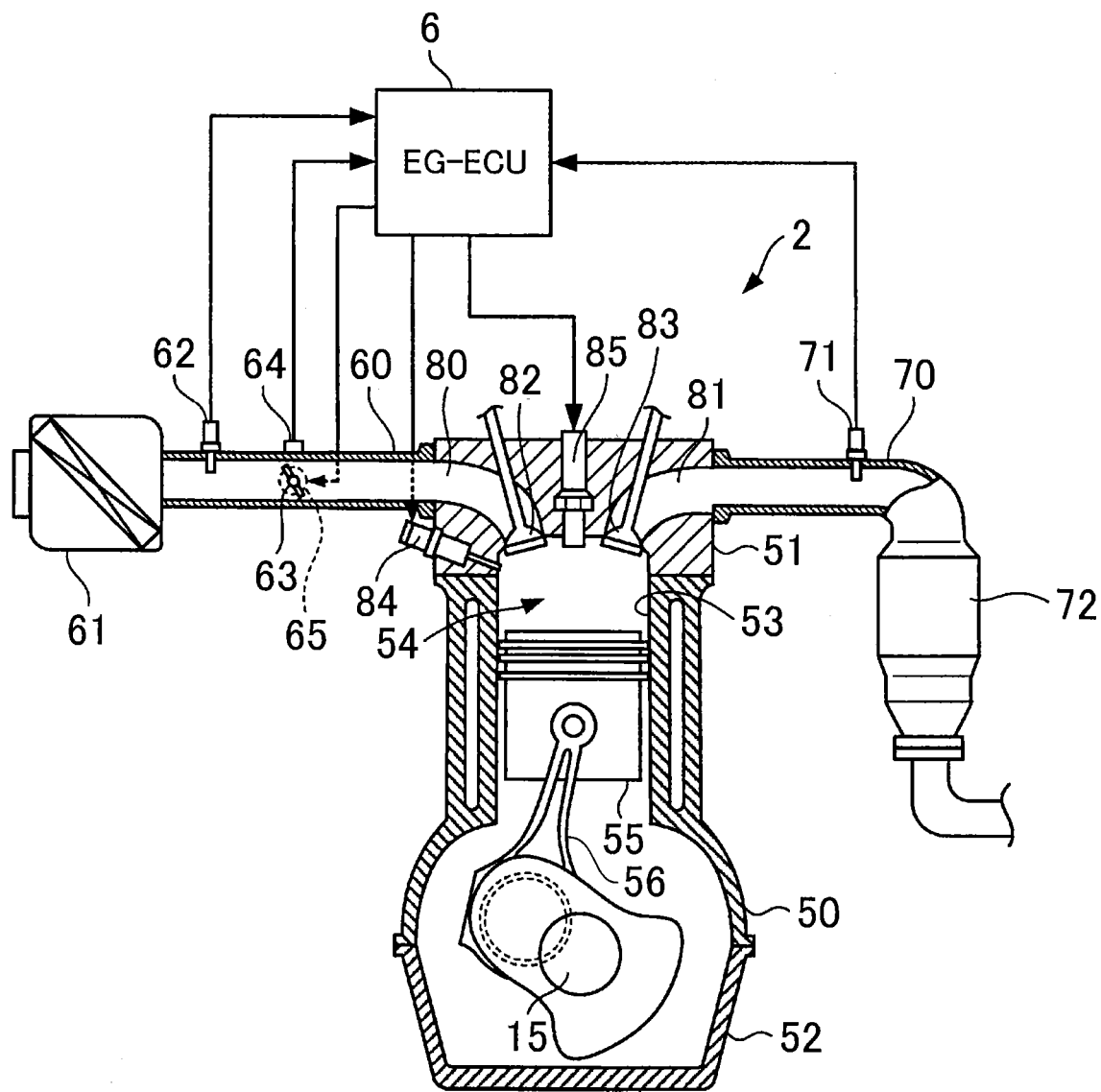
FIG. 2 is a schematic cross-sectional view of the engine shown in FIG. 1.

As shown in FIG. 2, the engine 2 includes a cylinder block 50, a cylinder head 51 fixed to the upper portion of the cylinder block 50, and an oil pan 52 that stores oil, and a plurality of cylinders 53 are formed by the cylinder block 50 and the cylinder head 51. In the engine 2 shown in FIG. 2, one of the four cylinders 53 arranged in line is illustrated.

A piston 55 is accommodated in each cylinder 53 so as to be reciprocally movable. A combustion chamber 54 of each cylinder 53 is defined by the cylinder block 50, the cylinder head 51 and the corresponding piston 55. The engine 2 carries out a series of four strokes, that is, an intake stroke, a compression stroke, a combustion stroke and an exhaust stroke, while each piston 55 reciprocates twice.

Each piston 55 accommodated in the corresponding cylinder 53 is coupled to a crankshaft 15 via a corresponding connecting rod 56. The connecting rod 56 converts the reciprocating motion of the piston 55 to the rotation motion of the crankshaft 15.

Thus, the engine 2 reciprocally moves the piston 55 by combusting a mixture of fuel and air in the corresponding combustion chamber 54, and transmits power to a power transmission device 10 by rotating the crankshaft 15 via the corresponding connecting rod 56.

The engine 2 is provided with an intake pipe 60 that is coupled to the cylinder head 51 in order to introduce air into the combustion chambers 54. An air cleaner 61, an air flow sensor 62, a throttle valve 63 and a throttle sensor 64 are provided in the intake pipe 60. The air cleaner 61 cleans air flowing in from an outside of the vehicle. The air flow sensor 62 detects the flow rate of air that is introduced into the combustion chambers 54, that is, an intake air amount Ga. The throttle valve 63 is used to adjust the intake air amount Ga. The throttle sensor 64 detects the opening degree of the throttle valve 63.

The air cleaner 61, for example, removes foreign matter in intake air with the use of a paper accommodated inside or a nonwoven filter made of synthetic fiber. The air flow sensor 62 is provided upstream of the throttle valve 63, and outputs a detection signal indicating an intake air amount Ga to the EG-ECU 6.

The throttle valve 63 is formed of a thin disc-shaped valve element, and includes a shaft at the center of the valve element. The throttle valve 63 includes a throttle valve actuator 65. The throttle valve actuator 65 pivots the valve element by pivoting the shaft in response to control of the EG-ECU 6, and causes the throttle valve 63 to adjust the intake air amount Ga.

The engine 2 is provided with an exhaust pipe 70 that is coupled to the cylinder head 51 in order to emit exhaust gas, produced through combustion of air-fuel mixture in the combustion chambers 54, to the outside of the vehicle. An air-fuel ratio sensor 71 and a catalyst 72 are provided in the exhaust pipe 70. The air-fuel ratio sensor 71 detects the overall air-fuel ratio AF of the engine 2. The catalyst 72 is used to oxidize, reduce and purify toxic substances in exhaust gas.

The air-fuel ratio sensor 71 detects an air-fuel ratio AF that indicates the ratio of the amount of air to the amount of fuel in air-fuel mixture in each combustion chamber 54, and outputs a detection signal that linearly indicates the detected air-fuel ratio AF to the EG-ECU 6.

The catalyst 72 generally includes a three-way catalyst that is able to efficiently remove toxic substances, such as unburned hydrocarbons (HC), carbon monoxide (CO) and nitrogen oxides (NOx), contained in exhaust gas. The three-way catalyst desirably has the function of efficiently removing NOx from exhaust gas having a high NOx content.

Intake ports 80 and exhaust ports 81 are formed in the cylinder head 51. Each intake port 80 communicates the intake pipe 60 with the corresponding combustion chamber 54. Each exhaust port 81 communicates the corresponding combustion chamber 54 with the exhaust pipe 70.

Intake valves 82, exhaust valves 83, injectors 84 and ignition plugs 85 are provided at the cylinder head 51. Each intake valve 82 controls introduction of air for combustion from the intake pipe 60 to the corresponding combustion chamber 54. Each exhaust valve 83 controls emission of exhaust gas from the corresponding combustion chamber 54 to the exhaust pipe 70. Each injector 84 injects fuel into the corresponding combustion chamber 54. Each ignition plug 85 ignites air-fuel mixture in the corresponding combustion chamber 54.

Each injector 84 includes a solenoid coil and a needle valve. The solenoid coil is controlled by the EG-ECU 6. Fuel is supplied to each injector 84 at a predetermined pressure. When the solenoid coil is energized by the EG-ECU 6, the injector 84 injects fuel into the corresponding combustion chamber 54 by opening the needle valve.

Each ignition plug 85 is formed of a known ignition plug having electrodes made of platinum or iridium alloy. Each ignition plug 85 discharges when the electrodes are energized by the EG-ECU 6, and ignites air-fuel mixture in the corresponding combustion chamber 54.

As shown in FIG. 1, the transaxle 5 includes the power transmission device 10, a gear mechanism 11 and a differential gear 12. The power transmission device 10 includes motor generators MG1 and MG2, a power split mechanism 13 and a speed reducer 14. The motor generators MG1 and MG2 convert electric power and torque to each other. The power split mechanism 13 splits power generated by the engine 2 into power that is transmitted to the drive wheels 4R and 4L and power that drives the motor generator MG1. The speed reducer 14 reduces the speed of rotation transmitted from the motor generator MG2 and amplifies driving torque.

The power split mechanism 13 includes an input shaft 17, a sun gear 19, a ring gear 20, a plurality of pinion gears 21 and a carrier 22. The input shaft 17 is coupled to an end portion of the crankshaft 15 via a damper 16. The crankshaft 15 serves as an output shaft of the engine 2. The sun gear 19 is coupled to a hollow sun gear shaft 18 having a shaft center through which the input shaft 17 extends. The ring gear 20 is arranged concentrically with the sun gear 19 such that a rotation axis coincides with the rotation axis of the sun gear 19. The plurality of pinion gears 21 are arranged between the sun gear 19 and the ring gear 20 so as to be in mesh with the sun gear 19 and the ring gear 20. The carrier 22 retains the pinion gears 21 such that each pinion gear is rotatable around its axis and revolvable around the input shaft 17.

In this way, the power split mechanism 13 constitutes a planetary gear mechanism that includes the sun gear 19, the ring gear 20, the pinion gears 21 and the carrier 22 as rotating elements, that splits the power generated by the engine 2 and that integrates powers transmitted from the motor generator MG1 and the drive wheels 4R and 4L.

Thus, the power split mechanism 13 splits the power, input from the engine 2 to the carrier 22, into power to the sun gear 19 and power to the ring gear 20 on the basis of the gear ratio, causes the motor generator MG1 to function as a generator using one of the split powers, and causes the drive wheels 4R and 4L to rotate using the other one of the split powers.

When the motor generator MG1 to which driving electric power is supplied functions as an electric motor and the engine 2 is driven, the power split mechanism 13 integrates power input from the engine 2 to the carrier 22 with power input from the motor generator MG1 to the sun gear 19 and outputs the integrated power from the ring gear 20.

When the motor generator MG1 to which driving electric power is supplied functions as an electric motor and the engine 2 is stopped, the power split mechanism 13 outputs power, input from the motor generator MG1 to the sun gear 19, to the carrier 22 to rotate the crankshaft 15, thus starting the engine 2.

The motor generator MG1 includes a stator 23 and a rotor 24. The stator 23 forms revolving magnetic fields. The rotor 24 is arranged inside the stator 23. A plurality of permanent magnets are embedded in the rotor 24. The stator 23 includes a stator core and three-phase coils wound around the stator core.

The rotor 24 is coupled to the sun gear shaft 18 that rotates integrally with the sun gear 19 of the power split mechanism 13. The stator core of the stator 23 is, for example, formed of laminated thin plates made of magnetic steel sheet, and is fixed to the inner peripheral portion of a body case 25.

In the thus configured motor generator MG1, when three-phase alternating-current powers are supplied to the three-phase coils of the stator 23, revolving magnetic fields are formed by the stator 23, and the permanent magnets embedded in the rotor 24 are attracted by the revolving magnetic fields. By so doing, the rotor 24 is driven for rotation. In this way, the motor generator MG1 functions as an electric motor.

When the permanent magnets embedded in the rotor 24 rotate, revolving magnetic fields are formed, and induced currents flow through the three-phase coils of the stator 23 due to the revolving magnetic fields. Thus, electric power is generated between both ends of each of the three-phase coils. In this way, the motor generator MG1 also functions as a generator. Note that the motor generator MG1 may be configured as a rotating electrical machine according to the invention.

The motor generator MG2 includes a stator 26 and a rotor 27. The stator 26 forms revolving magnetic fields. The rotor 27 is arranged inside the stator 26. A plurality of permanent magnets are embedded in the rotor 27. The stator 26 includes a stator core and three-phase coils wound around the stator core.

The rotor 27 is coupled to a rotor shaft 28 coupled to the speed reducer 14. The stator core of the stator 26 is, for example, formed of laminated thin plates made of magnetic steel sheet, and is fixed to the inner peripheral portion of a body case 29.

In the thus configured motor generator MG2, when three-phase alternating-current powers are supplied to the three-phase coils of the stator 26, revolving magnetic fields are formed by the stator 26, and the permanent magnets embedded in the rotor 27 are attracted by the revolving magnetic fields. By so doing, the rotor 27 is driven for rotation. In this way, the motor generator MG2 functions as an electric motor.

When the permanent magnets embedded in the rotor 27 rotate, revolving magnetic fields are formed, and induced currents flow through the three-phase coils of the stator 26 due to the revolving magnetic fields. Thus, electric power is generated between both ends of each of the three-phase coils. In this way, the motor generator MG2 also functions as a generator.

The speed reducer 14 includes a sun gear 30, a ring gear 31, a plurality of pinion gears 32 and a carrier 33. The sun gear 30 is coupled to the rotor shaft 28 coupled to the rotor 27 of the motor generator MG2. The ring gear 31 is arranged concentrically with the sun gear 30 such that a rotation axis coincides with the rotation axis of the sun gear 30. The plurality of pinion gears 32 are arranged between the sun gear 30 and the ring gear 31 so as to be in mesh with the sun gear 30 and the ring gear 31. The carrier 33 has a support shaft, one end of which is fixed to the body case 29 and the other end of which supports the pinion gears 32 such that each pinion gear 32 is rotatable around its axis.

In this way, the speed reducer 14 constitutes a planetary gear mechanism that includes the sun gear 30, the ring gear 31 and the pinion gears 32 as rotating elements and that reduces the speed of rotation transmitted from the motor generator MG2 and amplifies driving torque.

Thus, when the motor generator MG2 to which driving electric power is supplied functions as an electric motor, the speed reducer 14 reduces the speed of rotation transmitted from the motor generator MG2, amplifies driving torque and outputs the amplified driving torque from the ring gear 31.

The speed reducer 14 causes the motor generator MG2 to function as a generator by attenuating driving torque of which rotation is accelerated by power input to the ring gear 31 and then outputting the attenuated driving torque from the sun gear 30.

A counter drive gear 34 is provided for the ring gear 20 of the power split mechanism 13 and the ring gear 31 of the speed reducer 14 such that the ring gear 20 and the ring gear 31 rotate integrally with each other.

The counter drive gear 34 is in mesh with the gear mechanism 11, and the gear mechanism 11 is in mesh with the differential gear 12. Power output to the counter drive gear 34 is transmitted from the counter drive gear 34 to the differential gear 12 via the gear mechanism 11.

The differential gear 12 is connected to the drive shafts 3R and 3L, and the drive shafts 3R and 3L are respectively connected to the drive wheels 4R and 4L. That is, power transmitted to the differential gear 12 is output to the drive wheels 4R and 4L via the drive shafts 3R and 3L.

Thus, the motor generator MG2 to which driving electric power is supplied functions as a driving source. Power generated by the motor generator MG2 is transmitted to the drive wheels 4R and 4L.

The motor generator MG2 to which no driving electric power is supplied functions as an electric power regenerator that reduces the speed of rotation of each of the drive wheels 4R and 4L and converts the rotational force to electric power.

The hybrid vehicle 1 includes inverters 40 and 41 and a motor electronic control unit (hereinafter, referred to as "MG-ECU") 42. The inverters 40 and 41 are respectively provided in correspondence with the motor generators MG1 and MG2. The MG-ECU 42 controls the inverters 40 and 41 for executing drive control over the motor generators MG1 and MG2.

Each of the inverters 40 and 41 exchanges electric power between a corresponding one of the motor generator MG1 and the motor generator MG2 and a battery 43, that is, charges or discharges the battery 43, on the basis of control of the MG-ECU 42.

Power lines 44 that connect the inverter 40 and the inverter 41 to the battery 43 are respectively formed as a positive electrode bus and a negative electrode bus that are shared by the inverter 40 and the inverter 41. By so doing, it is possible to consume electric power, which is generated by one of the motor generators MG1 and MG2, at the other motor generator.

Although not shown in the drawing, the MG-ECU 42 is formed of a microprocessor that includes a central processing unit (CPU), a read only memory (ROM), a random access memory (RAM), a flash memory, and input/output ports.

A program for functioning the microprocessor as the MG-ECU 42 is stored in the ROM of the MG-ECU 42. That is, the CPU of the MG-ECU 42 executes the program stored in the ROM using the RAM as a work area. By so doing, the microprocessor functions as the MG-ECU 42.

Signals that are required to execute drive control over the motor generators MG1 and MG2 are input to the MG-ECU 42. The signals are, for example, detected signals of rotational position detection sensors 45 and 46 that respectively detect the rotational positions of rotors of the motor generators MG1 and MG2, detected signals of current sensors (not shown) that respectively detect phase currents that are input to the motor generators MG1 and MG2, and the like.

The MG-ECU 42 executes drive control over the motor generators MG1 and MG2 by outputting switching control signals to the inverter 40 and the inverter 41.

The MG-ECU 42 communicates with another ECU, such as the HV-ECU 7, via a high-speed controller area network (high-speed CAN), and exchanges various control signals and data with another ECU, such as the HV-ECU 7.

For example, the MG-ECU 42 executes drive control over the motor generators MG1 and MG2 by controlling the inverters 40 and 41, respectively, in response to control signals input from the HV-ECU 7. The MG-ECU 42, where necessary, outputs data relating to driving states of the motor generators MG1 and MG2 to the HV-ECU 7.

The hybrid vehicle 1 includes a battery electronic control unit (hereinafter, referred to as "B-ECU") 47. The B-ECU 47 manages a state, such as a state of charge and a temperature, of the battery 43. Although not shown in the drawing, the B-ECU 47 is formed of a microprocessor that includes a CPU, a ROM, a RAM, a flash memory and input/output ports.

A program for functioning the microprocessor as the B-ECU 47 is stored in the ROM of the B-ECU 47. That is, the CPU of the B-ECU 47 executes the program stored in the ROM using the RAM as a work area. By so doing, the microprocessor functions as the B-ECU 47.

Signals required to manage the state of the battery 43 are input to the B-ECU 47. The signals, for example, indicate a terminal voltage from a voltage sensor (not shown) arranged between the terminals of the battery 43, a charge/discharge current that is detected by a current sensor 48 connected to one of the power lines 44, connected to the output terminal of the battery 43, and a battery temperature from a temperature sensor (not shown) attached to the battery 43.

The B-ECU 47 communicates with another ECU, such as the HV-ECU 7, via the high-speed CAN, and exchanges various control signals and data with another ECU, such as the HV-ECU 7.

For example, the B-ECU 47, where necessary, outputs data relating to the state of the battery 43 to the HV-ECU 7. The B-ECU 47 calculates a state of charge (SOC) that indicates a remaining level of the battery 43 on the basis of an accumulated value of the charge/discharge current detected by the current sensor 48, and outputs the calculated SOC to the HV-ECU 7.

Although not shown in the drawing, the EG-ECU 6 is formed of a microprocessor that includes a CPU, a ROM, a RAM, a flash memory and input/output ports. A program for functioning the microprocessor as the EG-ECU 6 is stored in the ROM of the EG-ECU 6.

That is, the CPU of the EG-ECU 6 executes the program stored in the ROM using the RAM as a work area. By so doing, the microprocessor functions as the EG-ECU 6.

The EG-ECU 6 communicates with another ECU, such as the HV-ECU 7, via the high-speed CAN, and exchanges various control signals and data with another ECU, such as the HV-ECU 7.

For example, the EG-ECU 6 executes operation control over the engine 2, such as fuel injection control, ignition control and intake air amount adjustment control, on the basis of a control signal that is input from the HV-ECU 7, detection signals that are input from various sensors that detect the operating states of the engine 2, and the like, and, where necessary, outputs data relating to the operating states of the engine 2 to the HV-ECU 7.

Although not shown in the drawing, the HV-ECU 7 is formed of a microprocessor that includes a CPU, a ROM, a RAM, a flash memory and input/output ports. A program for functioning the microprocessor as the HV-ECU 7 is stored in the ROM of the HV-ECU 7.

That is, the CPU of the HV-ECU 7 executes the program stored in the ROM using the RAM as a work area. By so doing, the microprocessor functions as the HV-ECU 7.

The HV-ECU 7 is connected to another ECU, such as the EG-ECU 6, via the high-speed CAN, and exchanges various control signals and data with another ECU, such as the EG-ECU 6.

As will be specifically described below, the HV-ECU 7 detects a rich imbalance in air-fuel ratio AF among the plurality of cylinders 53 on the basis of a variation $\Delta AF$ per unit time in air-fuel ratio AF that is detected by the air-fuel ratio sensor 71. Here, the rich imbalance means a state where the air-fuel ratio AF of at least one of the plurality of cylinders 53 is lower than the air-fuel ratio AF of each of the other cylinders 53.

A first map that associates an empirically predetermined first threshold TH1 and an empirically predetermined second threshold TH2 lower than the first threshold TH1 with the intake air amount Ga of the engine 2 and a second map that associates an empirically predetermined third threshold TH3 with the intake air amount Ga of the engine 2 are stored in advance in the ROM of the HV-ECU 7.

Here, the first map corresponds to a region of the intake air amount Ga in which the frequency of use by the hybrid vehicle 1 is relatively high, and the second map corresponds to a region of the intake air amount Ga that is higher than the region of the intake air amount Ga indicated by the first map.

Note that the region of the intake air amount Ga of the engine 2, indicated by the first map, corresponds to a first detection region, and the region of the intake air amount Ga of the engine 2, indicated by the second map, corresponds to a second detection region. In the following description, the first detection region is termed "low Ga region", and the second detection region is termed "high Ga region".

The HV-ECU 7 detects a rich imbalance in air-fuel ratio AF among the cylinders 53 on the condition that the intake air amount Ga of the engine 2 falls within the low Ga region. The HV-ECU 7 receives the intake air amount Ga detected by the air flow sensor 62 and the air-fuel ratio AF detected by the air-fuel ratio sensor 71 via the EG-ECU 6.

The HV-ECU 7 calculates a variation in air-fuel ratio AF per unit time or a derivative value of the air-fuel ratio AF, that is, an air-fuel ratio variation $\Delta AF$, on the basis of the air-fuel ratio AF. The HV-ECU 7 obtains a minimum value $\Delta AFmin$ of the air-fuel ratio variation $\Delta AF$ while the engine 2 operates one cycle, that is, the crankshaft 15 rotates two revolutions (720° CA).

Figure 3:
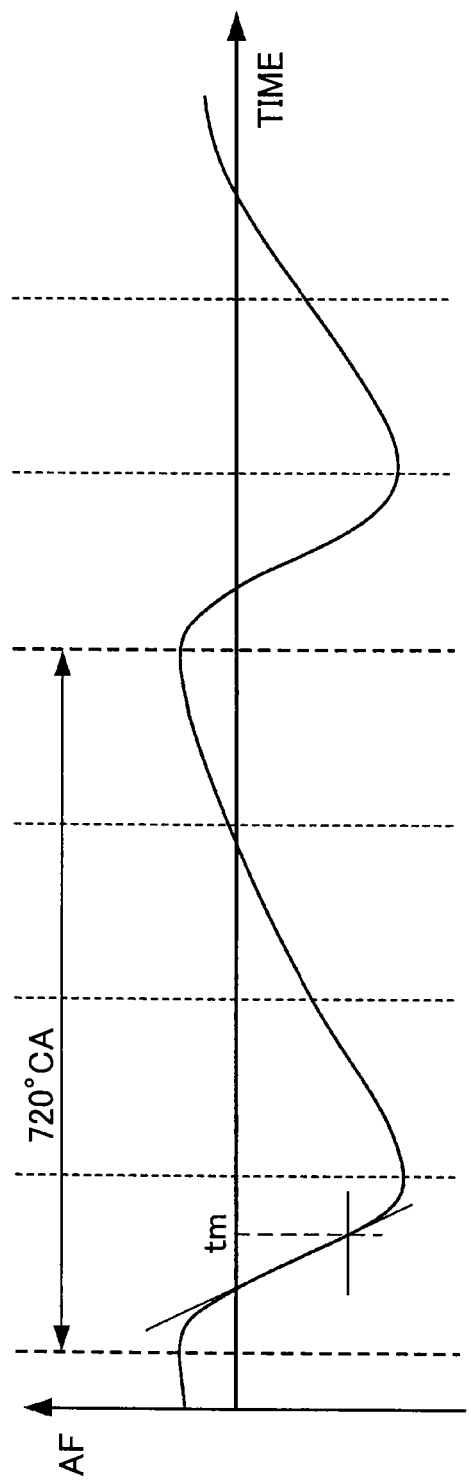
FIG. 3 is a graph that shows the correlation between an air-fuel ratio and time when there is an imbalance in air-fuel ratio among cylinders of the engine shown in FIG. 1.

For example, when the air-fuel ratio AF indicated by the detection signal output from the air-fuel ratio sensor 71 varies as shown in FIG. 3, the air-fuel ratio AF is reduced the most at time tm during 720° CA, so the HV-ECU 7 sets a derivative value of the air-fuel ratio AF, that is, the air-fuel ratio variation $\Delta AF$, at time tm as the minimum value $\Delta AFmin$.

As shown in FIG. 1, the HV-ECU 7 obtains a detected value $\Delta AFn$ by averaging a predetermined number of samples N (for example, 100) of the minimum values $\Delta AFmin$. Therefore, the HV-ECU 7 stores a number of samples N of the minimum values $\Delta AFmin$ in the flash memory.

The HV-ECU 7 determines that there is no rich imbalance in air-fuel ratio AF among the cylinders 53 on the condition that the detected value $\Delta AFn$ is higher than or equal to the first threshold TH1 that is associated with the intake air amount Ga by the first map.

The HV-ECU 7 determines that it is indeterminate whether there is a rich imbalance in air-fuel ratio AF among the cylinders 53 on the condition that the detected value $\Delta AFn$ of a rich imbalance in air-fuel ratio AF among the cylinders 53 falls within a predetermined range, that is, the detected value $\Delta AFn$ is lower than the first threshold TH1 and is higher than or equal to the second threshold TH2. The first threshold TH1 and the second threshold TH2 are associated with the intake air amount Ga by the first map.

The HV-ECU 7 determines that there is a rich imbalance in air-fuel ratio AF among the cylinders 53 on the condition that the detected value $\Delta AFn$ is lower than the second threshold TH2 associated with the intake air amount Ga by the first map.

The HV-ECU 7 detects a rich imbalance in air-fuel ratio AF among the cylinders 53 on the condition that the intake air amount Ga of the engine 2 falls within the high Ga region.

The HV-ECU 7 obtains the detected value $\Delta AFn$ as described above, and determines that there is no rich imbalance in air-fuel ratio AF among the cylinders 53 on the condition that the detected value $\Delta AFn$ is higher than or equal to the third threshold TH3 associated with the intake air amount Ga by the second map.

The HV-ECU 7 determines that there is no rich imbalance in air-fuel ratio AF among the cylinders 53 on the condition that the detected value $\Delta AFn$ is lower than the third threshold TH3 associated with the intake air amount Ga by the second map. As described above, the HV-ECU 7 may be configured as a rich imbalance detecting unit according to the invention.

When the HV-ECU 7 determines that it is indeterminate whether there is a rich imbalance in air-fuel ratio AF among the cylinders 53, the HV-ECU 7 controls the engine 2 so as to operate at the intake air amount Ga that falls within the high Ga region.

Specifically, the HV-ECU 7 transmits a signal that indicates the high Ga region to the EG-ECU 6. The EG-ECU 6 controls the throttle valve actuator 65 to adjust the opening degree of the throttle valve 63 such that the intake air amount Ga of the engine 2 falls within the high Ga region. As described above, the HV-ECU 7 that cooperates with the EG-ECU 6 may be configured as an internal combustion engine control unit according to the invention.

The HV-ECU 7 controls the motor generator MG1 such that the motor generator MG1 consumes a power corresponding to an amount by which a power generated by the engine 2 is increased by operating the engine 2 at the intake air amount Ga that falls within the high Ga region (hereinafter, simply referred to as "power increase amount").

Specifically, the HV-ECU 7 transmits a control signal to the MG-ECU 42, and causes the MG-ECU 42 to control the inverter 40 such that an electric power corresponding to the power increase amount is generated by the motor generator MG1.

Here, it is desirable that the motor generator MG1 consume a power so as not to change the power by which the drive wheels 4R and 4L are driven even when the engine 2 is controlled by the EG-ECU 6 so as to operate at the intake air amount Ga that falls within the high Ga region.

With this configuration, when the engine 2 is controlled by the EG-ECU 6 so as to operate at the intake air amount Ga that falls within the high Ga region, it is possible to suppress influence on drivability. As described above, the HV-ECU 7 that cooperates with the MG-ECU 42 may be configured as a rotating electrical machine control unit according to the invention.

Figure 4:
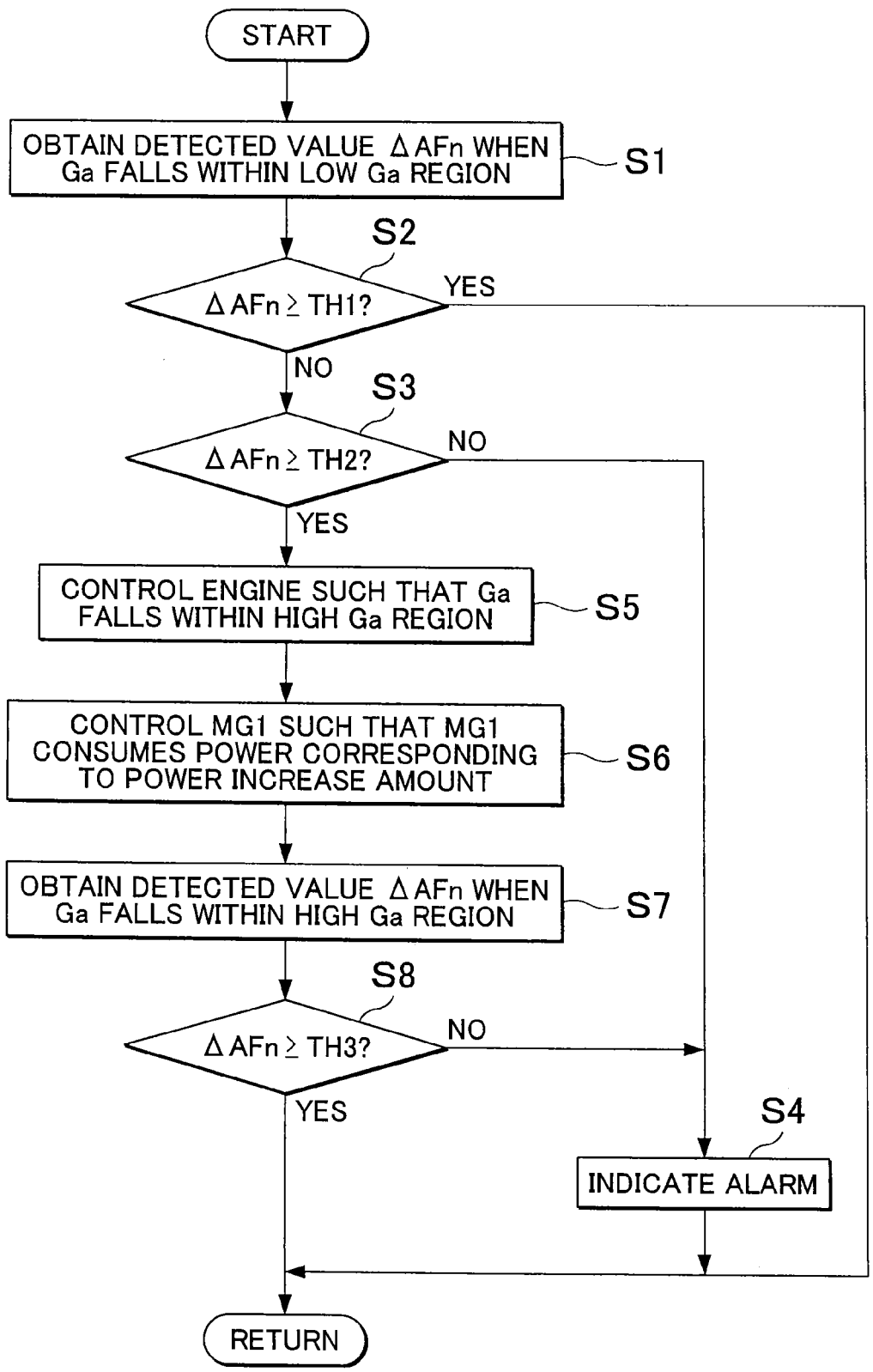
FIG. 4 is a flowchart that shows a rich imbalance detecting operation that is executed by the air-fuel ratio imbalance detecting device for an internal combustion engine according to the embodiment of the invention.

The rich imbalance detecting operation that is executed by the HV-ECU 7 in the thus configured hybrid vehicle 1 will be described with reference to FIG. 4.

First, the HV-ECU 7 obtains the detected value ΔAFn when the intake air amount Ga of the engine 2 falls within the low Ga region (step S1). It is determined whether the detected value ΔAFn is higher than or equal to the first threshold TH1 associated with the intake air amount Ga by the first map (step S2).

When it is determined that the detected value ΔAFn is higher than or equal to the first threshold TH1, the HV-ECU 7 determines that the rich imbalance in air-fuel ratio AF has not been detected among the cylinders 53, and the rich imbalance detecting operation is ended.

On the other hand, when it is determined that the detected value ΔAFn is not higher than or equal to the first threshold TH1, the HV-ECU 7 determines whether the detected value ΔAFn is higher than or equal to the second threshold TH2 associated with the intake air amount Ga by the first map (step S3).

When it is determined that the detected value ΔAFn is not higher than or equal to the second threshold TH2, the HV-ECU 7 determines that the rich imbalance in air-fuel ratio AF has been detected among the cylinders 53, and, for example, an alarm that indicates that the rich imbalance in the air-fuel ratio AF has been detected among the cylinders 53 is indicated on a multi-information display, or the like (step S4), after which the rich imbalance detecting operation is ended.

On the other hand, when it is determined that the detected value ΔAFn is higher than or equal to the second threshold TH2, the HV-ECU 7 in cooperation with the EG-ECU 6 controls the engine 2 such that the intake air amount Ga of the engine 2 falls within the high Ga region (step S5). Furthermore, the HV-ECU 7 in cooperation with the MG-ECU 42 controls the motor generator MG1 such that a power corresponding to a power increase amount is consumed (step S6).

Subsequently, the HV-ECU 7 obtains the detected value ΔAFn when the intake air amount Ga of the engine 2 falls within the high Ga region (step S7), and determines whether the detected value ΔAFn is higher than or equal to the third threshold TH3 associated with the intake air amount Ga by the second map (step S8).

Here, when it is determined that the detected value ΔAFn is higher than or equal to the third threshold TH3, the HV-ECU 7 determines that the rich imbalance in air-fuel ratio AF has not been detected among the cylinders 53, and ends the rich imbalance detecting operation.

On the other hand, when it is determined that the detected value ΔAFn is not higher than or equal to the third threshold TH3, the HV-ECU 7 determines that the rich imbalance in air-fuel ratio AF has been detected among the cylinders 53, and, for example, indicates an alarm that indicates that the rich imbalance in air-fuel ratio AF has been detected among the cylinders 53 on the multi-information display, or the like (step S4), and then ends the rich imbalance detecting operation.

As described above, the air-fuel ratio imbalance detecting device for an internal combustion engine according to the embodiment of the invention increases the intake air amount Ga of the engine 2 while adjusting the power that is consumed by the motor generator MG1 on the condition that the detected value ΔAFn that is used to detect a rich imbalance in air-fuel ratio AF among the cylinders 53 falls within a predetermined range. By so doing, in the embodiment of the invention, the amount of exhaust gas emitted from the engine 2 is increased, so it is possible to accurately detect an imbalance in air-fuel ratio among the cylinders 53 of the engine 2.

In the present embodiment, the description is made on the example in which the air-fuel ratio imbalance detecting device for an internal combustion engine according to the invention is applied to the power split-type hybrid vehicle. A vehicle control device according to the invention may be applied to any vehicle as long as a vehicle includes the power split mechanism 13 that splits power generated by the engine 2 into power that is transmitted to the drive wheels 4R and 4L and power that drives the motor generator MG1.

The embodiment described above is illustrative and not restrictive in all respects. The scope of the invention is defined by the appended claims rather than the above description. The scope of the invention is intended to encompass all modifications within the scope of the appended claims and equivalents thereof.

As described above, the air-fuel ratio imbalance detecting device for an internal combustion engine according to the invention is able to accurately detect an imbalance in air-fuel ratio among the cylinders of the internal combustion engine. The air-fuel ratio imbalance detecting device for an internal combustion engine according to the invention is useful for an air-fuel ratio imbalance detecting device that detects a rich imbalance in air-fuel ratio among cylinders of an internal combustion engine of a vehicle that includes a power split mechanism that splits power generated by the internal combustion engine into power that is transmitted to a drive wheel and power that drives a rotating electrical machine.

What is claimed is:

1. An air-fuel ratio imbalance detecting device for an internal combustion engine of a vehicle that includes: the internal combustion engine; a rotating electrical machine; a drive wheel; and a power split mechanism that splits power generated by the internal combustion engine into power that drives the rotating electrical machine and power that drives the drive wheel, the air-fuel ratio imbalance detecting device comprising:

a rich imbalance detecting unit that, when an intake air amount of the internal combustion engine falls within a predetermined first detection region that is lower than a predetermined second detection region, detects a rich imbalance in air-fuel ratio among a plurality of cylinders formed in the internal combustion engine on the basis of a variation per unit time in air-fuel ratio that is detected by an air-fuel ratio sensor provided in an exhaust passage of the internal combustion engine;

an internal combustion engine control unit that, when the variation that is detected by the rich imbalance detecting unit in the first detection region falls within a predetermined range, controls the internal combustion engine so as to operate at the intake air amount that falls within the second detection region; and a rotating electrical machine control unit that controls the rotating electrical machine such that the rotating electrical machine consumes a power corresponding to a power increase amount of the internal combustion engine through operation of the internal combustion engine at the intake air amount that falls within the second detection region.

2. The air-fuel ratio imbalance detecting device according to claim 1, wherein the rich imbalance detecting unit detects a rich imbalance in air-fuel ratio among the cylinders on the basis of a minimum value of the variation per unit time in air-fuel ratio while the internal combustion engine operates one cycle.

3. The air-fuel ratio imbalance detecting device according to claim 2, wherein the rich imbalance detecting unit detects a rich imbalance in air-fuel ratio among the cylinders on the basis of an average of a predetermined number of the minimum value.

4. The air-fuel ratio imbalance detecting device according to claim 1, wherein the rotating electrical machine control unit controls the rotating electrical machine such that the rotating electrical machine consumes the power corresponding to the power increase amount of the internal combustion engine in order for the power that drives the drive wheel not to change through control of the internal combustion engine control unit that operates the internal combustion engine at the intake air amount that falls within the second detection region.

5. An air-fuel ratio imbalance detecting method for an internal combustion engine of a vehicle that includes: the internal combustion engine; a rotating electrical machine; a drive wheel; and a power split mechanism that splits power generated by the internal combustion engine into power that drives the rotating electrical machine and power that drives the drive wheel, the air-fuel ratio imbalance detecting method comprising:

when an intake air amount of the internal combustion engine falls within a predetermined first detection region that is lower than a predetermined second detection region, detecting a rich imbalance in air-fuel ratio among a plurality of cylinders formed in the internal combustion engine on the basis of a variation per unit time in air-fuel ratio that is detected by an air-fuel ratio sensor provided in an exhaust passage of the internal combustion engine;

when the variation that is detected in the first detection region falls within a predetermined range, controlling the internal combustion engine so as to operate at the intake air amount that falls within the second detection region; and controlling the rotating electrical machine such that the rotating electrical machine consumes a power corresponding to a power increase amount of the internal combustion engine through operation of the internal combustion engine at the intake air amount that falls within the second detection region.

* * * * *